United States Patent
Noghabi et al.

(10) Patent No.: US 12,392,907 B2
(45) Date of Patent: Aug. 19, 2025

(54) SATELLITE IMAGE MANAGEMENT

(71) Applicant: Microsoft Technology Licensing, LLC, Redmond, WA (US)

(72) Inventors: Shadi Noghabi, Bellevue, WA (US); Ranveer Chandra, Kirkland, WA (US); Krishna Chintalapudi, Redmond, WA (US); Peder Olsen, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 505 days.

(21) Appl. No.: 17/747,490

(22) Filed: May 18, 2022

(65) Prior Publication Data

US 2023/0375719 A1    Nov. 23, 2023

(51) Int. Cl.
| | | |
|---|---|---|
| *G01S 19/39* | (2010.01) | |
| *G01S 19/14* | (2010.01) | |
| *G01S 5/00* | (2006.01) | |
| *G01S 19/08* | (2010.01) | |
| *G06V 20/13* | (2022.01) | |

(52) U.S. Cl.
CPC ............ *G01S 19/393* (2019.08); *G01S 19/14* (2013.01); *G01S 5/0027* (2013.01); *G01S 19/08* (2013.01); *G06V 20/13* (2022.01)

(58) Field of Classification Search
CPC ........ G01S 19/14; G01S 19/393; G01S 19/08; G01S 5/0027; G01S 5/02; G06V 20/13
USPC .......... 342/352, 357.45, 357.22, 357.52, 450
See application file for complete search history.

(56) References Cited

U.S. PATENT DOCUMENTS

| | | | |
|---|---|---|---|
| 11,050,950 B2* | 6/2021 | Sainct | B64G 1/242 |
| 2015/0371431 A1* | 12/2015 | Korb | G06V 10/60 |
| | | | 382/113 |
| 2018/0157930 A1* | 6/2018 | Rutschman | G06V 20/13 |
| 2019/0304168 A1* | 10/2019 | Korb | G06F 18/22 |
| 2021/0314058 A1 | 10/2021 | Lucia et al. | |
| 2022/0017239 A1* | 1/2022 | Chen | G06V 20/13 |
| 2022/0327820 A1* | 10/2022 | Kurahara | G06V 20/13 |
| 2023/0222667 A1* | 7/2023 | Abdollahian Noghabi | |
| | | | G06V 20/13 |
| | | | 382/155 |
| 2024/0067364 A1* | 2/2024 | Lee | G05D 1/0094 |
| 2025/0047371 A1* | 2/2025 | Laurila | G01S 7/003 |

FOREIGN PATENT DOCUMENTS

| | | | | |
|---|---|---|---|---|
| CA | 3192971 A1 | | 3/2022 | |
| DE | 102008006432 A1 * | | 8/2009 | ........... B64G 1/1021 |
| WO | WO-2019075305 A1 * | | 4/2019 | ........... B64G 1/1021 |
| WO | WO-2022072430 A1 * | | 4/2022 | ........... B64G 1/1007 |
| WO | WO-2022245766 A1 * | | 11/2022 | ........... B64G 1/1021 |
| WO | WO-2023072639 A1 * | | 5/2023 | ........... B64G 1/1035 |

OTHER PUBLICATIONS

"International Search Report and Written Opinion Issued in PCT Application No. PCT/US23/019013", Mailed Date: Jul. 13, 2023, 14 Pages.

* cited by examiner

Primary Examiner — Chuong P Nguyen
(74) Attorney, Agent, or Firm — Rainier Patents, P.S.

(57) ABSTRACT

The description relates to context-aware management of satellite images. One example can track a satellite relative to locations on earth, ground stations, and other satellites and identify parameters associated with the tracked satellite. The example can manage images captured by the satellite for individual locations based upon the identified parameters.

20 Claims, 8 Drawing Sheets

SATELLITE IMAGE MANAGEMENT

BACKGROUND

The discussion relates to satellite imagery of the earth's surface. Satellites are constantly taking images of locations along the earth's surface. However, it is often difficult to store all of these images on the satellites and then download them to facilities on the earth.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

This patent relates to satellite image data of the earth's surface. Satellites are continuously taking images of various locations on the earth's surface. The satellites are only able to download images to earth under specific conditions, such as when the satellites are almost directly over (e.g., in range of) a ground station. Continuous imaging can produce more image data than can be downloaded as the satellite passes over the ground station. Rather than simply downloading all image data or discarding all data (such as all image data of oceans), the present concepts can provide context-aware management of the satellite image data including how data compression is employed. The context-aware management can be achieved by considering various parameters to identify which images and/or portions of images to compress and how to achieve the compression.

Traditionally, satellite images are downloaded as raw data to the ground for further processing. However, the scale of the data that is captured tends to be significantly higher than the network bandwidth available. As a result, often data is captured in a restricted mode, e.g., no data over ocean areas or with less frequency. This only becomes worse with the increasing trend of larger constellations of satellites and more frequent images of a given location, e.g., once a day vs. every few days. One way to fix this bottleneck is to compress the image data. While there are several techniques for compression, they all treat the images as a black box and each pixel has equal weight. However, in reality not all images or parts of images are equally important. For example, changes in buildings of an already developed rural area tend to be less frequent than a high-rise in a big city. Capturing both images with the same resolution and the same frequency would likely be a waste of resources. Instead, the present concepts relate to employing compression selected via context-aware management. The compression can be based upon the content of the image e.g., does the image capture changes to the location compared to previous images. The compression can also be based upon system parameters, such as availability of storage on the satellite for the image and/or download bandwidth to send the image to the earth. Context-aware image management can employ various techniques, such as using machine learning and/or edge computing in space, to smartly filter images based on many possible parameters, e.g., importance of data, whether there has been a change in the images or not, etc.

The present concepts can manage satellite image data based upon various parameters, such as resource parameters, image use parameters, whether there has been a change in the images or not, and/or image value parameters (e.g., importance of the image or portions of the image). Resource parameters can include downlink bandwidth from the satellite to the ground station, uplink bandwidth from the ground station to the satellite, inter-satellite bandwidth, processing resources on the satellite, storage resources on the satellite, and/or earth-based (e.g., ground-based) resources, such as ground stations and/or data center resources. Image use parameters can relate to an expected or desired use of the image. For instance, an intended use of tracking an active wildfire can result in different image context-based management than an image with an intended use of tracking desertification because the wildfire can be associated with short term changes whereas desertification tends to occur more slowly over a longer time period.

Another example of parameters that can be considered can relate to the expected reduction in data for the compute required. For instance, a desert area with more just "yellow" pixels can provide better compression. Similarly, an area covered by clouds, has more useless data than can be removed in a lossy fashion (as clouds may be removed anyway after the data is downloaded). In a similar fashion, the ability to reconstruct the image on earth, e.g., reconstructing an ocean area from lower resolution or previous images is likely easier than an urban area.

Image parameters can include image value parameters. The image value parameters can include the age of existing/previous images of the imaged location and/or relative resolution of the image compared to existing images. For instance, if a previous image of the location was taken relatively recently and is of relatively high resolution, then the current image can be managed to save resource usage associated with saving and/or downloading the image. Alternatively, if the previous images are relatively older and/or of lower resolution, then the current image may include changed parts at a high resolution and the management can prioritize downloading those parts.

The present concepts can utilize one or more parameters to decide how to manage these satellite images, such as where and/or how to compress the images to reduce downlink bandwidth consumption. These and other concepts are described below relative to use case scenarios explained relative to FIGS. 1A-1I, system architectures explained relative to FIG. 2, and methods explained relative to FIGS. 3 and 4.

Figure 1A:
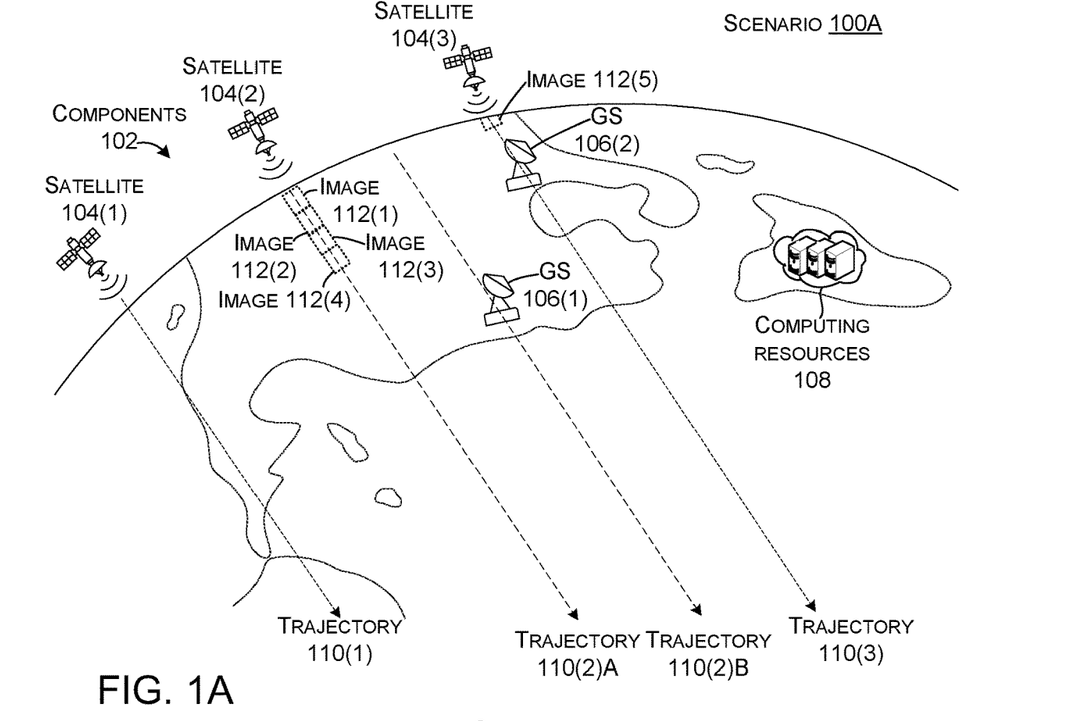
FIGS. 1A-1I show example scenarios relating to context-based satellite image management concepts in accordance with some implementations.

FIGS. 1A-1I collectively relate to example scenarios 100 and collectively show aspects of the present concepts. The scenarios can relate to multiple components 102 associated with satellite imagery of the earth's surface. The components 102 can include satellites 104, ground stations 106, and/or ground-based computing resources 108, such as data centers, among others. (Note that the limitations of line drawings impose some simplification of the illustrated aspects and the drawings are not to scale). These scenarios involve multiple satellites 104 orbiting around the Earth. In this case, three satellites 104(1)-104(3) are illustrated, but the present concepts can be applied to any number of satellites. The satellites 104 can be geo-stationary or travel along a trajectory 110 (represented by an arrow) relative to the earth. In the latter case, because the Earth is also rotating, the trajectory 110 can travel over different locations each revolution around the Earth. This is represented in FIG. 1A relative to satellite 104(2), which is traveling along trajectory arrow 110(2)A and then will come back over the horizon on arrow 110(2)B (and then trajectory 110(2)C, which is shown on FIG. 1F).

As shown in scenario 100A of FIG. 1A, some or all of the satellites 104 can be capable of capturing images 112 of locations on the surface of the Earth along their trajectory 110. For sake of brevity and to avoid clutter on the drawing page, only a few representative images 112 are shown. For instance, satellite 104(2) can capture images 112(1)-112(4) and satellite 104(3) can capture image 112(5). Traditionally, the satellites 104 have stored images 112 and then downloaded the images to a ground station 106 along the trajectory. For instance, satellite 104(3) can capture image 112(5), store the image, and then download the image to ground station 106(2).

However, this traditional configuration can produce multiple types of problems. For instance, satellite 104(2) can capture multiple images, including images 112(1)-112(4), along its trajectory 110(2) before it passes over an individual ground station (e.g., ground station 106(1) in this case). The total number of captured images may exceed the storage resources on satellite 104(2) and thus some images would have to be discarded.

Another traditional problem is that the duration of time that the satellite 104 is in range to download to the ground station 106 is insufficient at the available download bandwidth to download all of the images 112 that could have been captured and stored since the last download. One traditional satellite image management solution has been to delete images or only capture images of certain types of locations. For instance, traditionally images have been captured over land, but not over water to reduce the total number of images and hence storage and download bandwidth usage. However, this traditional solution results in image loss (e.g., images of some locations along the trajectory are not captured and/or are not downloaded to a ground station). The present concepts can address this image loss issue and/or other issues of traditional satellite image management. The present concepts can address image loss by considering one or more parameters associated with the satellite images when deciding how to manage the images 112 and/or components 102 associated with the images.

Figure 1B:
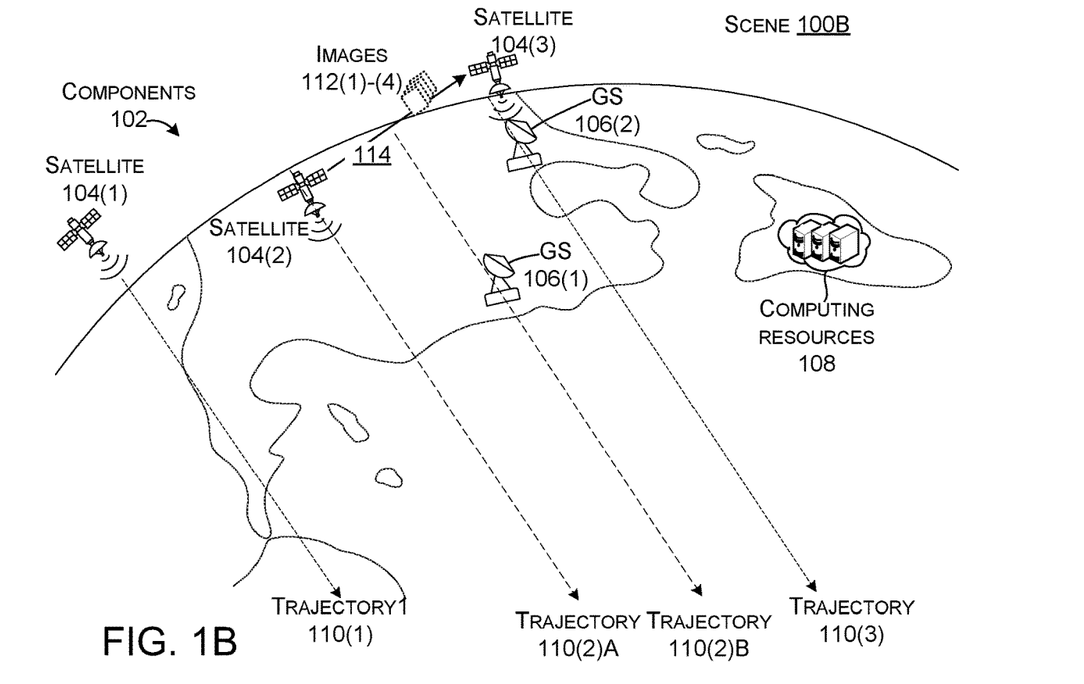

FIG. 1B shows an example scenario 100B involving context-aware image management to address a storage parameter that is consistent with the present concepts. For purposes of explanation, assume that in this scenario 100B, storage on satellite 104(2) is a limiting parameter in that the amount of storage is insufficient to store all of the images 112 that can be captured along the trajectory 110(2) before encountering the next ground station 106(1). In this example, other parameters, such as transmission bandwidth between satellites 104(2) and 104(3), storage on satellite 104(3), and download capacity between satellite 104(3) and ground station 106(2) are non-constraining (e.g., less constrained).

Accordingly, satellite 104(2) can be managed in a manner that addresses the constraining parameter. In this case, satellite 104(2) can send images 112(1)-112(4) to satellite 104(3) as indicated by arrow 114. Satellite 104(3) is within downloading range of ground station 106(2). Satellite 104(3) can receive the images 112(1)-112(4) and then download them to the ground station 106(2). Managing some of the images 112(1)-112(4) captured by satellite 104(2) in this way can reduce effects of the constraining parameter and thereby allow satellite 104(2) to image more of the locations it passes over and/or ultimately for more of the images to reach the earth where they can be used for various purposes.

Note also, individual images and/or portions of images can be managed separately based upon various parameters. Several such scenarios are described next.

Figure 1C:
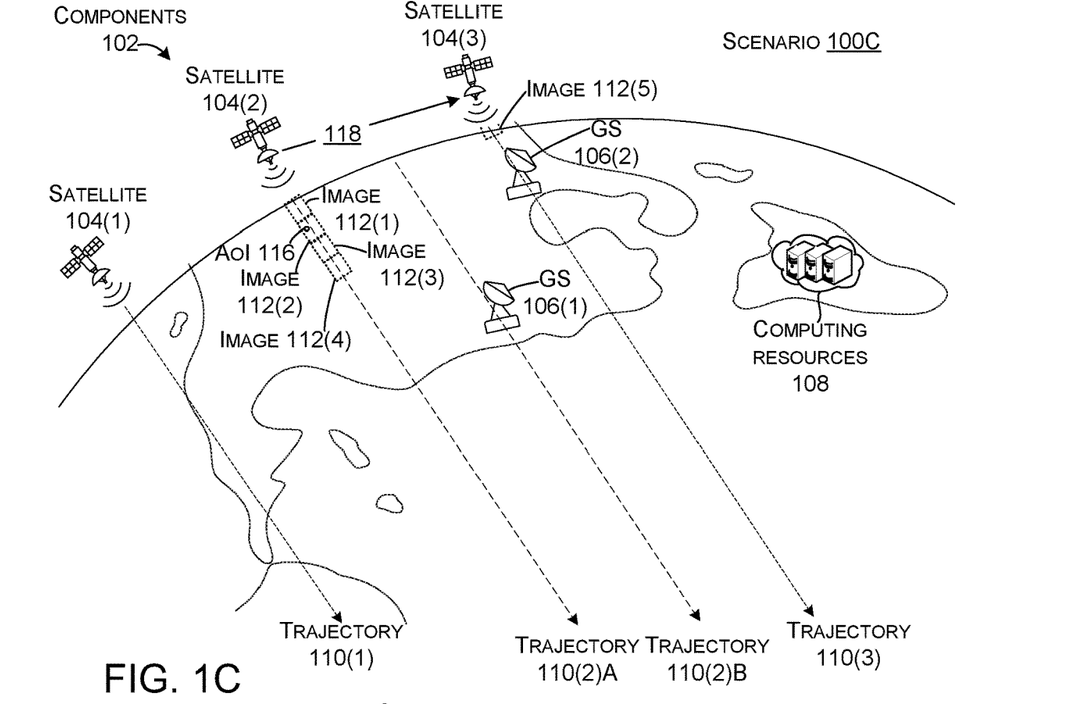

FIG. 1C shows another scenario 100C where parameters can be utilized to manage individual images and/or parts of images. In scenario 100C, image parameters relating to time sensitivity and/or level of interest can be included in determining how to manage individual images 112. For instance, an individual image may be of high interest or contain an area of interest 116, such as an active wildfire or flooded area, for example. Note that image 112(2) includes area of interest (AoI) 116, such as an active wildfire. In such a case, time can be of utmost importance for understanding events on the ground, and timely and potentially real-time availability of the area of interest 116 may even save lives, such as by allowing ample time to evacuate people relative to rapid fire growth.

This image 112(2) and/or this area of interest 116 can be managed differently than other images captured by satellite 104(2). For instance, the area of interest 116 could be transmitted from satellite 104(2) to another satellite 104 that is closer from a time perspective to being able to download the area of interest. In this example, satellite 104(2) can transmit area of interest 116 to satellite 104(3) as indicated by arrow 118. Satellite 104(3) is in range of ground station 106(2). The area of interest can be immediately downloaded and used to update an existing image similar to image 112(2) (e.g., including at least some of the same geographic area). In this scenario, the area of interest 116 is more important and is more likely to have changed while the remainder of the image tends to be more static. The remainder of image 112(2) can be handled in a standard manner and downloaded when satellite 104(2) approaches a ground station 106 and/or discarded. The image for this location can once again be updated utilizing the area of interest and the remainder of the current image or a previous image.

This technique could allow emergency service personnel to identify changes to the area of interest, such as fire growth and wind shift and evacuate crews and/or civilians that might have been trapped and perished before image 112(2) and the area of interest 116 were available utilizing traditional techniques. Thus, this management technique can provide a technical solution of reducing lag time from location imaging to image availability, such as by an hour or more. In this example, the parameters relating to the area of interest 116 convey a different context than the remainder of images 112(1)-112(4) and thus context-aware management of the area of interest can be different than for the remainder. The different context can alternatively or additionally relate to whether to compress the area of interest and/or whether to apply the same compression to the area of interest as the remainder of the image. These aspects are described in more detail below.

Figure 1D:
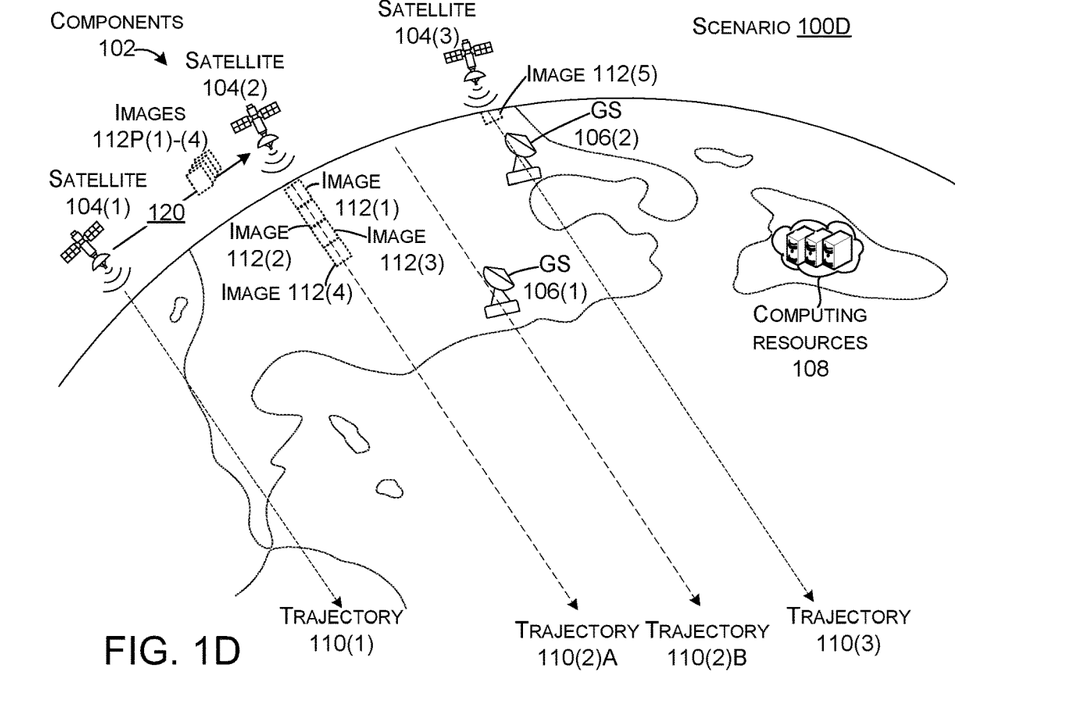

The two directly preceding scenarios relate to managing how images are downloaded from the satellite to the ground station. The next management scenario relates to reducing the amount of data associated with individual images so that less image data has to be stored and/or downloaded. One such scenario can generally involve determining what image data has changed from previous images of the same location and only saving and/or downloading the changes. The image can then be recreated on the ground from the existing images and the changes. FIG. 1D shows one such scenario.

FIG. 1D shows another context-aware management scenario 100D. Recall that the trajectory of satellites 104 is known and thus the locations that can be imaged from the satellite positions along the trajectory are known. This information can be used to locate existing images of these same locations because satellite images of locations are associated with coordinates conveying the location. Thus, images of a given location are readily identifiable.

In this example, assume that satellite 104(1) had previously imaged locations corresponding to images 112(1)-112(4) and is storing a copy of these previous images 112P(1)-(4) (where the suffix "P" connotates "previous"). These previous images 112P(1)-(4) can be sent to satellite 104(2) as indicated by arrow 120. The individual previous images 112P(1)-(4) can be compared to corresponding current images 112(1)-(4) to identify differences. The differences can be stored with a reduced amount of storage resources and downloaded with a reduced amount of downloading resources compared to traditional techniques.

This management technique provides a technical solution that reduces the impact of the images on the constrained parameters (e.g., storage on the satellite and download bandwidth). Computing resources generally tend to be less constrained on the ground than on the satellites and can be utilized to recreate the current images 112(1)-(4) from the differences and the previous images 112P(1)-(4). Thus, this technical solution can decrease usage of constrained resources or parameters to capture images and get them to the ground where the images can be recreated from the previous images and the differences.

Figure 1E:
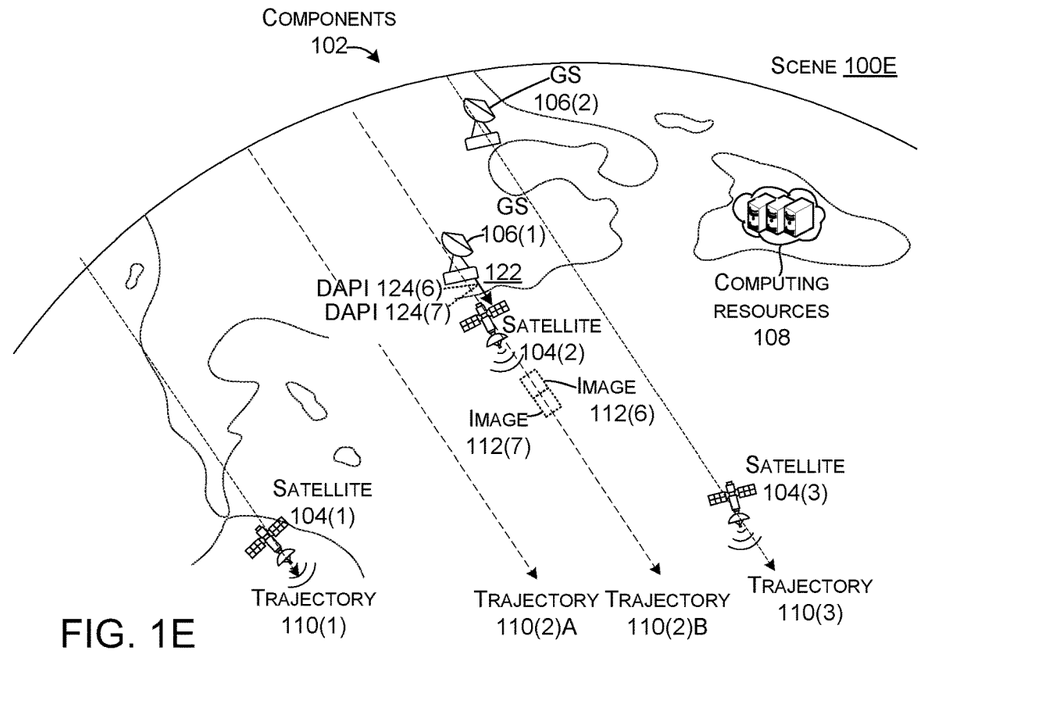

FIGS. 1E-1I show another scenario 100E. This example can manage the components 102 to reduce the amount of storage needed to store images on the satellites 104. As shown in FIG. 1E, satellite 104(2) is passing over ground station 106(1). The trajectory 110(2)B and hence the locations it passes over are known. Ground station 106(1) can upload information about these locations as indicated by arrow 122. The information can include data associated with previous images (DAPI) 124 of these locations. This DAPI 124 can include the images, portions of the images, hashes of the images, hashes of portions of the images (such as areas of interest discussed above), etc. In this case, the DAPI 124 relates to locations associated with representative images 112(6) and 112(7). (Two images are utilized here for ease of illustration, but the number of images involved will often be in the hundreds or thousands).

Figure 1F:
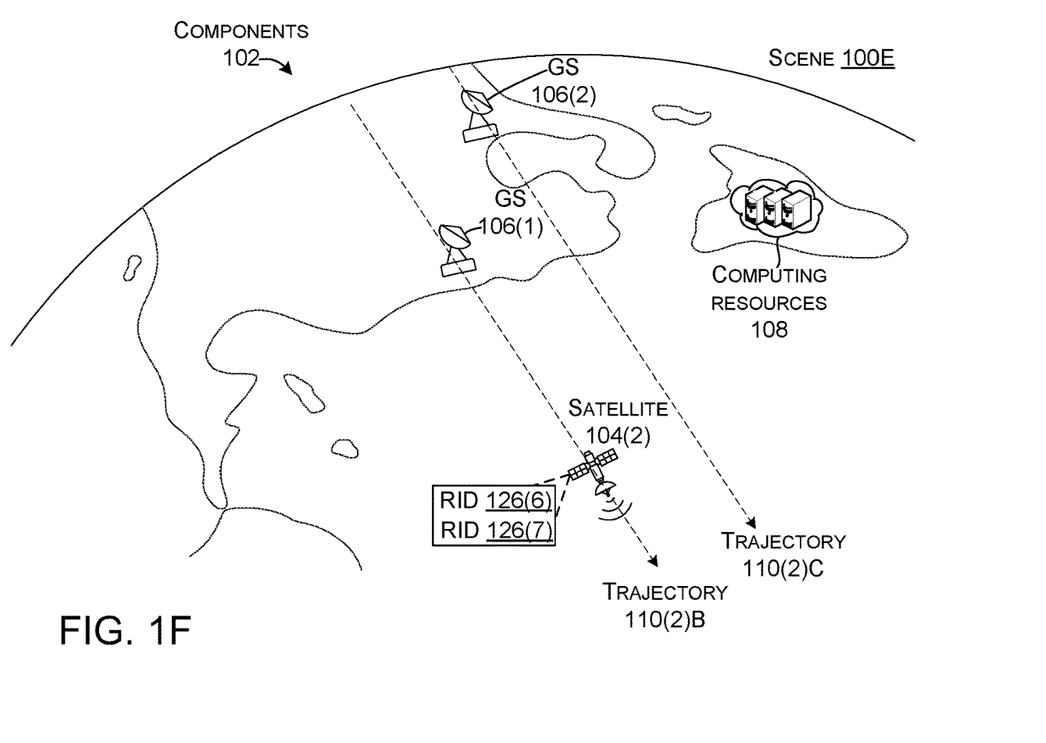

The satellite 104(2) can capture images 112(6) and 112(7) and can utilize the corresponding DAPIs 124(6) and 124(7) to process the images 112(6) and 112(7) into reduced image data (RID) 126(6) and 126(7) as shown in FIG. 1F. From one perspective, the DAPI 124 can be utilized to identify relatively important images or parts of images 112, such as changed images or changed image parts and relatively unimportant images or image parts, such as unchanged images or unchanged image parts. The processing can allow less data to be stored (as reduced image data 126(6) and 126(7)) than would be occupied by the images 112(6) and 112(7) with traditional storage techniques. The reduced image data 126(6) and 126(7) can be stored on the satellite 104(2). The image data reduction can be accomplished in a smart way that is based upon the DAPI rather than uniform image compression (e.g., uniform data compression of the entire image). Thus, the DAPI provides context for how to perform the data compression in a manner that prioritizes the high importance images and/or image parts. From one perspective this can be viewed as compression selected via context-aware image management.

Figure 1G:
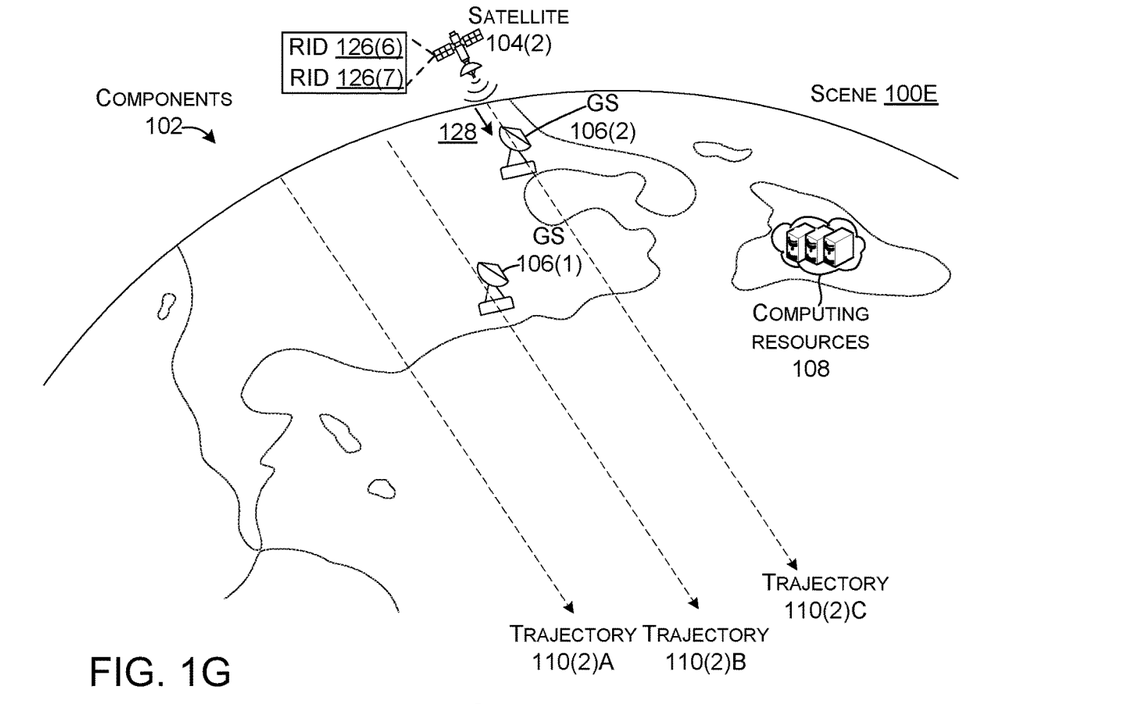

FIG. 1G shows satellite 104(2) continuing along its trajectory indicated at 110(2)C. The satellite 104(2) saved storage space by storing RID 126(6) and 126(7) rather than storing the images 112(6) and 112(7) in a traditional manner. Further, satellite 104(2) can download the RID 126(6) and 126(7) as indicated at 128 using less bandwidth than would be required with downloading traditional images.

Figure 1H:
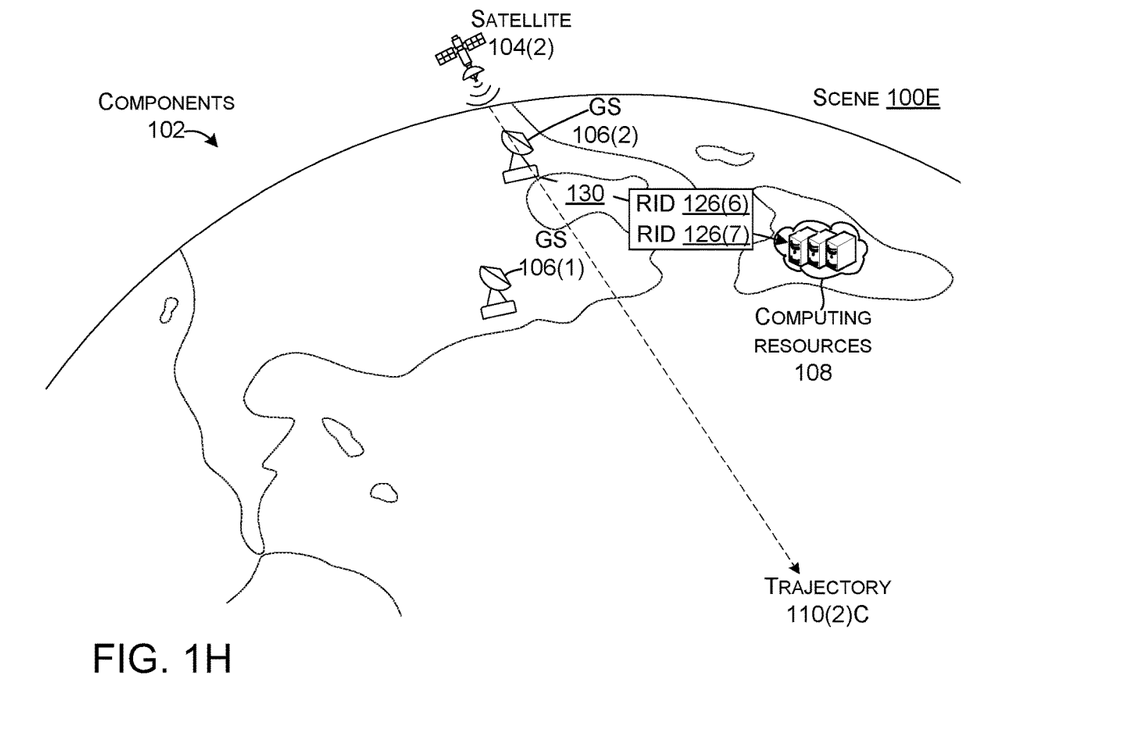
Figure 1I:
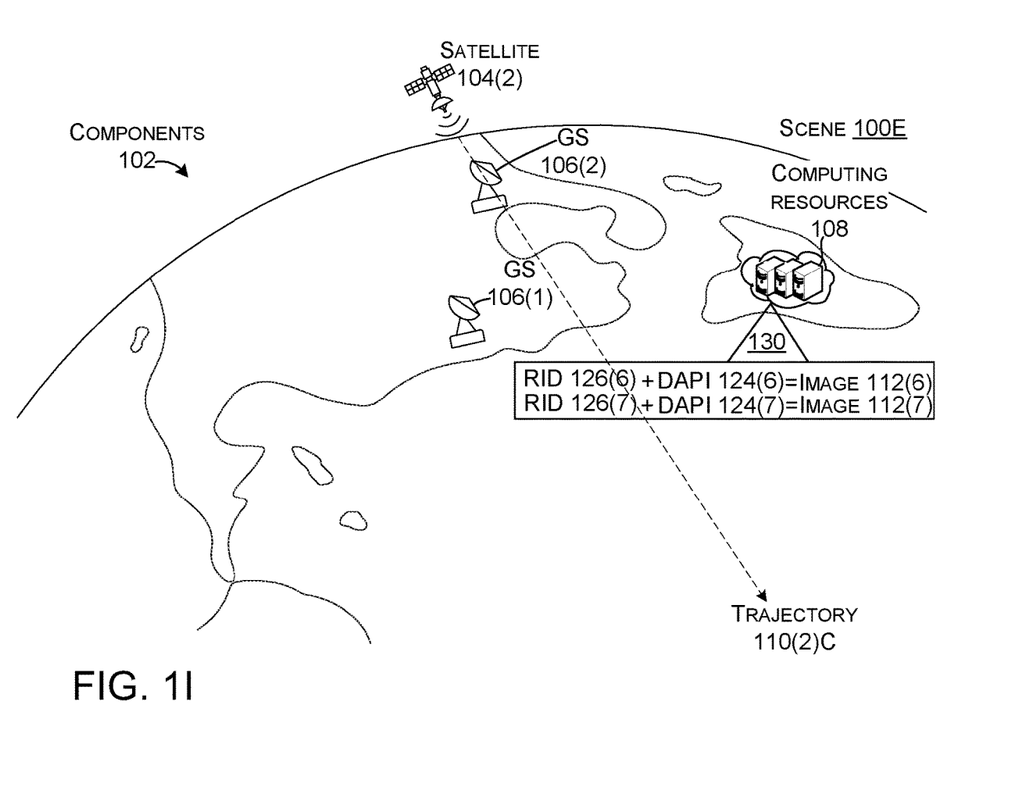

FIG. 1H shows at 130, the RID 126(6) and 126(7) can be communicated among resources on the ground for processing, such as by computing resources 108. FIG. 1I shows this processing 130 can essentially recreate the original images 112(6) and 112(7) from the RID 126(6) and 126(7) and the DAPIs 124(6) and 124(7) (e.g., low loss and/or no loss). This is represented on FIG. 1I as RID 126(6)+DAPI 124(6)=images 112(6) and RID 126(7)+DAPI 124(7)=images 112(7).

The recreated images 112 can have little or no data loss compared to the captured images in that the recreated images can contain essentially as much useful information as the captured images. For instance, in some configurations, unchanged areas (e.g., low importance parts) of the recreated image can be derived from the previous or existing images while the changed parts (e.g., high importance parts) are derived from the current captured image so that the recreated image is as useful as the captured image.

Note also, that for sake of brevity, single iteration scenarios are described above. However, the process can be iterative. For instance, in relation to images, such as image 112(1)-112(4) of FIG. 1A, hashes for corresponding previous images could be sent to the satellite 104(2). The satellite could generate hashes of the images 112(1)-112(4) and compare them to the hashes of the previous images. If the comparison shows that an image has changed compared to its previous image then further analysis can be performed. For instance, hashes of parts of the individual image can be sent to the satellite to compare against the same hashes of the new image. This can identify which parts of the image have actually changed. The changed parts of the changed images can be downloaded to the ground station while other parts and images can be discarded to save storage space and/or network bandwidth. Alternatively, the changed parts can remain uncompressed or be lightly compressed and the unchanged parts and unchanged images can be highly compressed and all of the compressed data can be downloaded.

The scenarios described above can address the fact that satellites are continuously capturing images of various parts of the earth. The amount of data generated from the captured images is often more than the storage available on the satellite and/or download/downlink bandwidth available. Various context-aware management techniques can be employed to reduce the amount of image data that is stored and downloaded without losing image resolution. For instance, some context-aware management techniques can identify relatively more valuable parts of images and relatively less valuable part of images. The relatively more important parts can be handled differently than the relatively less valuable parts. For instance, less valuable parts can be compressed to a greater degree than more valuable parts. This aspect is described in more detail below relative to FIGS. 2-4.

Figure 2:
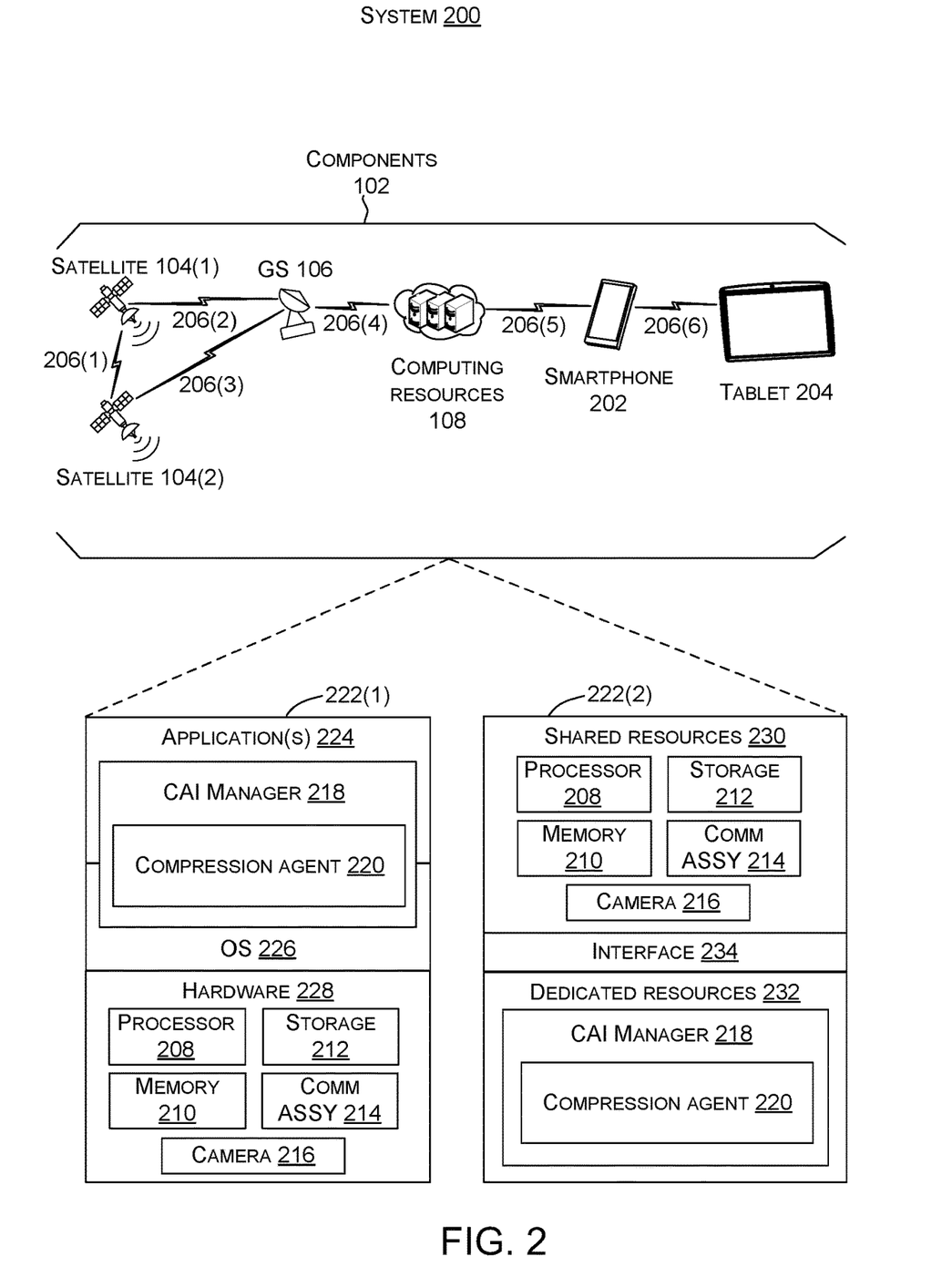
FIG. 2 shows an example system for accomplishing context-based satellite image management concepts in accordance with some implementations.

FIG. 2 shows an example system 200 that can provide context-aware satellite image management including smart image compression. For purposes of explanation, system 200 can include various components 102, such as satellites 104, ground stations 106, computing resources 108, and devices, such as smartphone 202 and/or tablet 204, among other devices. The components 102 can be communicatively coupled by networks (represented by lightning bolts) 206.

Note that bandwidth of network 206(1) between satellites 104(1) and 104(2) can be different than bandwidth of networks 206(2) and 206(3) between ground station 106 and satellites 104(1) and 104(2). The bandwidth and the duration for which the network is available can be treated as parameters that are considered when determining how to manage the satellite images. For instance, the bandwidth of network 206(1) between satellites 104(1) and 104(2) may be much higher, such as an order of magnitude higher than bandwidth of networks 206(2) and 206(3) between the ground station 106 and individual satellites 104(1) or 104(2).

The components 102 can include processors 208, memory, 210, storage 212, communication assemblies 214, cameras 216, and/or context-aware image (CAI) managers 218. The communication assemblies 214 can provide communication between components 102 over networks 206, such as by utilizing various wireless communication technologies. The cameras 216 can be configured to allow the satellites 104 to capture images of locations on the surface of the earth.

The CAI managers 218 can utilize parameters to determine how to manage images from individual satellites. For instance, CAI managers 218 can be configured to identify a trajectory of an individual satellite until the satellite passes over a ground station. The CAI managers can determine, for individual locations along the trajectory, whether to download individual images of the locations to the ground station for processing by earth-based resources or to process the individual images utilizing space-based resources and download processed data from the individual images to the ground station. Toward this end, the CAI managers 218 can include, or interact with, compression agents 220. Thus, CAI managers 218 on the satellites and/or on the ground can make compression decisions regarding individual images from individual satellites. The CAI managers 218 can then cause compression agents 220 at the selected location (e.g., the satellite that captured the individual image, another satellite, and/or a ground-based resource) to perform the compression. The compression agents 220 can select various smart compression techniques based upon the parameters associated with individual satellite images. Example smart compression techniques are described below relative to FIG. 3.

FIG. 2 shows two device configurations 222 that can be employed by any or all of components 102. Individual components 102 can employ either of configurations 222(1) or 222(2), or an alternate configuration. (Due to space constraints on the drawing page, one instance of each configuration is illustrated). Briefly, configuration 222(1) represents an operating system (OS) centric configuration. Configuration 222(2) represents a system on a chip (SOC) configuration. Configuration 222(1) is organized into one or more applications 224, operating system 226, and hardware 228. Device configuration 222(2) is organized into shared resources 230, dedicated resources 232, and an interface 234 therebetween.

In configuration 222(1), the CAI managers 218 can be manifest as part of, or by, the processor 208. Alternatively, the CAI managers 218 can be manifest as an application 224 that operates in conjunction with the processor 208. In configuration 222(2), the CAI managers 218 can be manifest as part of the processor 208 or as a dedicated resource that operates cooperatively with the processor 208.

In some configurations, each of components 102 can have an instance of the CAI managers 218. However, the functionalities that can be performed by CAI managers 218 may be the same or they may be different from one another. For instance, in some cases, each component's CAI managers 218 can be robust and provide all of the functionality described above and below (e.g., a device-centric implementation).

In other cases, some components 102 can employ a less robust instance of the CAI managers 218 that relies on some functionality to be performed by another component. For instance, CAI managers 218 on computing resources 108 can determine how to manage images obtained by individual satellites for some portions of their trajectory. This CAI manager 218 may communicate with other components' CAI managers 218 to cause DAPIs to be available on the satellite (and/or another satellite), for context-aware image processing to be performed, and for the RIDs to be reprocessed to recreate the images. For instance, CAI managers 218 on computing resources 108 identify the locations associated with the trajectory and locate existing images for the locations.

The CAI managers 218 on computing resources 108 can determine how to handle the existing images based upon various parameters, such as location, image content, bandwidth between the location and the satellite, storage on the satellite, etc. The CAI managers 218 on computing resources 108 can then command other CAI managers 218 to facilitate image management. Thus, one CAI manager 218 may perform a command role while other CAI managers 218 operate in a subservient role.

The various CAI managers 218 can operate cooperatively to manage images associated with the satellite. Thus, from one perspective, an individual CAI manager may determine a strategy for an individual satellite and communicate with other CAI managers to accomplish the strategy, such as by employing compression agents 220 to compress satellite image data prior to downloading to ground stations 106. Thus, the CAI managers 218 can utilize any or all of components 102 as edge devices that can contribute to the determined context-aware image management solution. For instance, downlink/download network bandwidth may be the constraining resource parameter relating to getting images to earth, but in space, network bandwidth between satellites may be less constrained than processing and/or storage. In such a case, the CAI managers 218 may distribute compression tasks across multiple satellites and then download the compressed images from individual satellites that have surplus download bandwidth.

The term "device," "computer," "computing device," or "component" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 222(2) can be thought of as a system on a chip (SOC) type design. In such a case, functionality provided by the device can be integrated on a single SOC or multiple coupled SOCs. One or more processors 208 can be configured to coordinate with shared resources 230, such as memory 210, storage 212, etc., and/or one or more dedicated resources 232, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. In the case of a software implementation, for instance, these may represent program code that performs specified tasks when executed on a processor (e.g., CPU or CPUs). The program code can be stored in one or more computer-readable memory devices, such as computer-readable storage media. The features and techniques are platform-independent, meaning that they may be implemented on a variety of commercial computing platforms having a variety of processing configurations.

Figure 3:
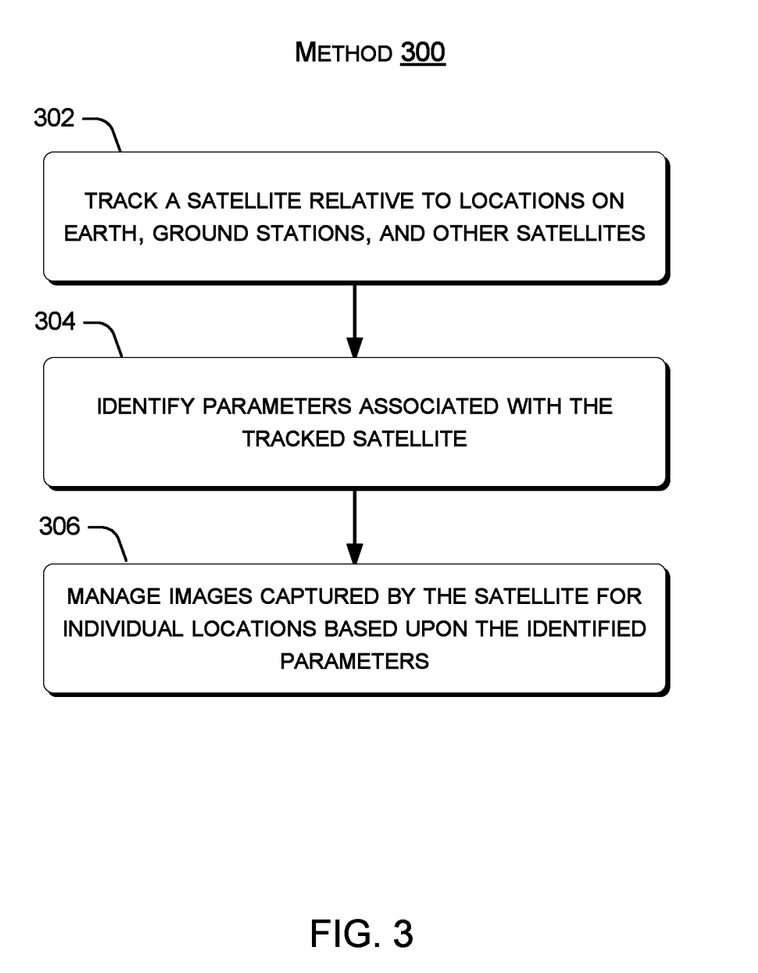
FIGS. 3-4 show example flowcharts for accomplishing context-based satellite image management concepts in accordance with some implementations.

FIG. 3 shows an example satellite image management method or technique 300. Block 302 can track a satellite relative to locations on earth, ground stations, and/or other satellites. The tracking can determine what locations the satellite is going to fly over, and potentially be able to image, before reaching a ground station. Note that the term 'fly over' does not necessarily mean that the satellite is directly above the location. Some satellites are only capable of imaging straight down, but others are able to image at an angle, such as an acute angle relative to the location. The term 'fly-over' is intended to cover both the former and latter scenarios.

Block 304 can identify parameters associated with the tracked satellite. The parameters can relate to the satellite itself, such as its processing power, amount of memory and/or storage, image size, etc. The parameters can also relate to other system aspects, such as network bandwidth and/or availability of other satellites that are or will be in communication with the tracked satellite. The parameters can also relate to the location, such as known changes at the location and/or areas of interest, among others.

Block 306 can manage images captured by the satellite for individual locations based upon the identified parameters. Multiple parameters can be considered including those mentioned above. The parameters can include the content of the images, such as interest in the image or portions of the image and/or changes in the image compared to previous images.

These content-based parameters can be balanced with other parameters, such as storage and downlink/download bandwidth parameters. For instance, if the satellite is approaching a ground station and has enough storage available and enough downlink bandwidth is available, then image compression may not be heavily weighted in the context-aware management decision. In contrast, if the satellite is going to capture many more high value images and it does not have adequate storage and/or is not going to have enough available downlink bandwidth, then compression may be weighted higher in the context-aware management decision. Several example compression techniques are described below that can perform smart lossless compression on the images.

Note that techniques for handing images can be dynamically updated. For instance, ground-based resources may identify a technique or plan for handling individual images based upon various image parameters, such as historical images and/or simulators to decide a compression plan. The satellite can receive the compression plan and implement it, and/or the satellite can dynamically adjust the compression plan based on the actual images captured online, e.g., based on cloud coverage, weather conditions, etc.

One example compression technique that can be applied in a smart context-based manner is differential-based compression (e.g., diff-based compression). Instead of compressing entire images, the image can be compared against an existing image to identify differences. Thus, the differentiating can identify image parts that have changed. The image parts that are different can be individual pixels or groups of pixels. This technique can save storage and/or download resources because in some implementations only the changed image parts are stored and downloaded. The image can be recreated with ground-based resources from the new 'changed parts' and the existing images. This aspect was discussed above relative to FIG. 1I.

This diff-based compression technique can be extended from more than just a most recent existing image to a history (e.g., set) of existing images of the location. The present implementations can address several technical problems relating to how to get the history since satellite trajectories change over time and the existing images might be captured by another satellite in the constellation. Thus, an older image where the sun is at a similar orientation to the present conditions may be more useful than a newer image with the sun at a different orientation, for instance. One technical solution to this problem can involve uploading existing image data (and/or parts of the existing image) that is stored on the ground to the satellite or another satellite. This existing image data can then be available to determine how to compress the current image.

Some configurations can communicate a new image and an existing image to a processor for comparison. In some implementations, the communicating can entail uploading the existing image to the satellite that captured the new image so that it can perform the processing. In other cases, the communicating can entail sending both the existing image and the new image to another component, such as another satellite for processing.

In some cases, the communicating entails communicating the actual new image and the actual existing image. However, in other cases, derivatives of the new image and the existing image can be obtained and communicated. For instance, the derivative may entail hashes created from the new image and the existing image. If the hashes are the same then there are no changes to the new image and new image may not be downloaded. If the hashes are different, then the image can be downloaded or additional measures can be taken to identify the changed parts with more specificity. In such a case, the new image and the existing image can be divided into an array of parts. A hash can be performed on each part. A comparison of the hashes can indicate which parts have changed.

This comparison process can be iteratively repeated until a desired level of specificity is achieved. A determination of how many iterations to perform can consider multiple parameters, such as resource parameters. For instance, the amount of network bandwidth and processing resources consumed by each iteration can be compared to potential download bandwidth savings achieved when downloading the changed parts rather than a larger portion of the image.

An example for managing satellite images relating to areas of interest and/or changed image parts is described below. In this case, satellite 'A' captures a specific area of interest, e.g., a forested area on a first date, such as November 28. Utilizing the present techniques this satellite has the option to compress the data using historical data. This historical data can reside in multiple places: 1) previous images captured by the current satellite (satellite A), stored on its local storage; 2) images downlinked to the ground stored on earth (either on the current ground station or the cloud); or 3) other satellites (satellite B, satellite C, etc.) in the same constellation. One goal can be to detect that most of the image has stayed the same except for a changed area, such as a cleared forest area, and only send that portion of the image, as the rest of the image, such as a standing forest may be relatively unchanged. One determination is: 1) which historical image (or images) to compare against, and 2) how to do the comparison using one of the many options: send the entire new image to the location of the historical image, send the entire old image to the location of the current satellite, or send both images to a third location. In the aforementioned choices, instead of the full resolution image (current or historical), the present techniques can use a transformed version, either lower resolution, or hash of the image.

In some implementations, by default, if the current satellite has a local copy of the captured frame, that will be used for comparison (rather than using other satellites or on the ground images). If such an image does not exist, or the difference in conditions are very large (e.g., local historical image was captured at night and current image is during the day), the present techniques can use an alternative historical image. This selection process if outlined in further detail below.

Each image or frame F captured, is broken into tiles {T1, T2, . . . } (which is a grid map of the frame).

One goal is for each tile Ti, find a historical tile Tj that is similar to the current tile (thus, good compression ratio) and that is simple to transfer to/from (thus, practical to get the historical reference tile Tj).

Similarity metric: Sim(Ti, Tj) captures the expected similarity between two captured frames. This incorporates features such as the angle, altitude, time of day, weather conditions (cloud, haze), etc. Essentially, this metric is a representative of the expected effectiveness of using Tj as a historical baseline of Ti. This similarity metric can be defined either manually by an expert, or through a machine learning approach.

An example machine learning approach can entail the following aspects. The data set can be a series of historical images, and their capture feature as an input vector e.g., (angle, altitude, time of day, . . . ) and the label as the ratio of similar/compressible pixels. A model can be trained that can predict the similarity metric (label of similar/compressible pixels).

The input of the model would be two tiles, and their corresponding feature vector. The output would be the similarity metric.

Simple to transfer to/from: This depends on the bandwidth between two locations: Sat_cur (which captured the current frame and tile Ti) and L_hist (the location with the historical tile Tj). L_hist, can be another satellite or the ground.

Some of the present implementations can model this as the time_to_transfer (T, Loc): which represent the time it takes for transferring tile T to location Loc. This modeling considers the next time of contact to ground station and the dynamics of space and satellites.

Overall Optimization

```
For each tile T_i captured by sat Sj {
    for each location Locj with historical tile Tj of Ti {
        //transfer historical image to satellite
        val1_j=ValueFunction( sim(Ti, Tj), (time_to_transfer(Tj, Sj) )
        //or transfer new image to historical image location
        val2_j= ValueFunction( sim(Ti, Tj), (time_to_transfer(Ti, Locj) )
    }
}
```

Goal: Maximize (Max(val1_j, val2_j)) for any j.
Subject to bandwidth and storage restrictions.

Value function: a compound function that combines both similarity metric and time to transfer in a weighted way. This can be any value function, but in the simplest form, can be a multiplication of sim(Ti, Tj)*time_to_transfer( ).

Use of hashed or transformed data: in relation to the optimization formulation outlined above, instead of taking into account time_to_transfer( ) of the raw tile, some implementations could consider various variations and different resolutions. Also, another alternative is to consider hashed versions.

The discussion above and below can provide a technical solution that can involve using storage in the satellites to keep a history of images and/or image derivatives (e.g., a data cache) and inter-satellite links to send the history of images to the current satellite or to send the currently captured image to the satellite with the history of images to perform the filtering (e.g., determine delta between previous image and current image). This context-aware management decision can be based upon multiple parameters including storage on the current satellite, and/or number of images to be captured along the trajectory before the next download opportunity (e.g., ground station fly over), among others. Similarly, storage on other satellites, such as those in the same constellation can be considered. Thus, raw storage can be considered as a parameter and/or available storage can be considered. Available storage can be viewed as storage that will not be used by other components to achieve their own functionality. Bandwidth and processing resource parameters can be considered in a similar manner because the trajectory of each satellite can be considered along with the location of ground stations along the trajectories. Thus, while network bandwidth for downloading from satellites to ground stations may be the most constrained parameter in some situations, management decisions to reduce download bandwidth usage can be made while considering other parameters, such as processing and power availability.

Another technical solution can involve image reconstruction on the ground. Image reconstruction can involve identifying parts of a current image that can be successfully reconstructed on earth without sending the actual image. Instead of sending the entire new images, this technique can send features of the new images and reconstruct the image on the earth (e.g., with earth-based resources) and thereby decrease download bandwidth usage. For example, one such technique can send the boundaries of a building and reconstruct the roof (e.g., areas within the boundaries) of the building on the ground. Another example can involve cloudy areas or parts of images. Instead of sending the image for these cloudy parts, the borders of the cloudy areas can be sent along with some information about the clouds, such as cloud type. This information can be utilized by earth-based resources to recreate the cloudy areas of the images.

Another technical solution can involve the user of auto-encoders. Auto encoders can be employed in a generic sense and/or to build auto encoders specifically for satellite imagery. In addition, the present concepts can involve building context aware auto encoders for various types of land on the earth, e.g., ocean, desert, etc. These would tend to be less lossy and faster, than other techniques.

As discussed above, another technical solution can involve filtering the new images based upon the value of the image parts. Non-valuable parts of the images can be identified or otherwise distinguished from high value parts. For instance, cloudy parts of the image may have low or no value. The parts having no value or a value below a threshold can be filtered out and not considered for downloading thus decreasing bandwidth usage. Data from existing images of the location can be utilized to populate these low value parts. In some circumstances, this technique can generate a version of the new image that has more information than the captured new image. For instance, suppose that the new image has a changed part that is of high interest and another part that is covered with clouds. The changed part can be downloaded and combined with previous 'clear or non-cloudy' image data to create a high value hybrid image.

Another smart content-based compression technical solution can involve prediction-based compression. Prediction-based compression can involve looking at the existing image(s) to predict aspects of the new images and the relative importance of compressing each part of the image. For instance, prediction-based compression can look at the trend of changes in a developing area and decide how frequently images should be captured. This can be contrasted with a deserted or static area that likely can be imaged less frequently without decreasing image value (as perceived by interested users).

As mentioned previously, the present concepts can download less data than is contained in the captured images and yet the ultimate image on the ground can have the same image quality as the captured image. Stated another way, the present techniques can offer lossless compression and/or if any loss occurs it does not affect the value of the image. For instance, the loss could relate to clouds or static areas. Note however, that prediction-based compression can entail resource savings while offering resolution enhancements compared to the captured image.

Some prediction-based compression techniques can be accomplished with various machine learning techniques, such as neural networks. One type of neural network that can be employed is artificial generative adversarial networks (GANs). Recall that individual existing images and/or the new image may be captured with different satellites having different sensors. To address this issue, the GANs can perform a sensor transformation that can map images having different spectrums to create more valid comparisons. The sensor transformation allows the GANs to use existing images of the location as a training set.

The GANs can then learn to generate new data with the same or similar statistics as the training set. One instance of the GAN can run on the satellite and reduce the new image to a set of features. The features tend to be much smaller, from a data perspective, than the image. The features of the new image can be downloaded. Another instance of the GAN running on the ground can recreate the image from the features.

In a complementary manner, the GANs can also recreate parts of the new image on the ground. For instance, historical trends in the existing images can be used to build GANs for different types/categories of land areas (e.g., features). Those GANs can then accurately predict similar areas on the new images so that they don't have to be downloaded. This aspect can be viewed as using the past to predict the future and to establish importance of compressing areas of the new images.

Note also, that in some cases, some of the previous images may be higher resolution (in whole or part) than the new image. From one perspective, the GANs can utilize the previous images to 'recreate' the new image at a higher resolution than its native resolution without even downloading the new image.

Prediction information can be used to determine whether and/or how to compress image areas. For instance, if an active wildfire is happening, the areas proximate to the wildfire can be indicated as "non-compressible" so that they are always captured and downloaded at full fidelity. Alternatively, such areas could be indicated as non-compressible based upon human designation. For instance, if emergency personnel indicate interest in an area, then that area can be treated as non-compressible.

An example prediction-based technique is now described.

1 Terminology

Let Y be an observed satellite image sequence with a corresponding mask M showing which pixels are of interest (1 for pixels to keep and 0 for everything else), and let X be a close approximation to the image sequence Y. Let $N_t$ be the number of time points, $N_c$ the number of bands or channels in the multispectral or hyperspectral image, $4N_h \times N_w$ the size of the images and $N_r$ is the rank of the approximation $X=UV^T$. The matrices Y, M and X have size $N_c N_t \times N_h N_w$, while $U \in \mathbb{R}^{N_c N_t \times N_r}$, $V \in \mathbb{R}^{N_h N_w \times N_r}$. The notation $X_t$ is the submatrix corresponding to the image approximation at time t. ○ represents element wise multiplication. Note that in this example it is suitable to let $N_t=1$. Compression performance is influenced by the size of the product $N_c N_t$.

2 Matrix Completion

To compress Y this technique can reduce/minimize the following loss function over rank $N_r$ matrices $X=UV^T$ $$F(X) = \|M \circ (X-Y)\|_F^2 + \alpha \sum_{t=1}^{N_t-1} \|X_{t+1} - X_t\|_F^2.$$

Here V can be viewed as a shared segmentation across the spectral bands. For a satellite image, each row of V can be viewed as representing different land-types or land characteristics. On the other hand U represents the spectro temporal evolution of each land-type. The optimization method in Algorithm 1 was developed with the specific purpose of cloud in-painting, but it can be used here to solve 1 and consequently use the low-rank representation to efficiently compress multi-spectral and hyper-spectral images. For the purposes of compression this technique can add several enhancements to the algorithm. It should also be noted that in the case of $N_t=1$ the second term of (1 vanishes and the optimization problem simplifies into a conventional matrix completion problem. Further simplifications can be made when M is independent of the spectral channels.

---
Algorithm 1: The Cloud Completion Algorithm.
---

Input: Satellite data: Y, cloud-free mask: M, rank
    $N_r$, damping coefficient $\alpha$.
Output: Cloud-free data: $X = UV^T$,
    $U \in \mathbb{R}^{N_c N_p \times N_r}$, $V \in \mathbb{R}^{N_n N_w \times N_r}$
1  $D \in \mathbb{R}^{N_p \times N_t} < 0$ // forward difference
2  $D_{ii} \leftarrow -1, D_{i,i+1} \leftarrow 1, \forall i \in \{1, \ldots, N_t - 1\}$
3  $Z \in \mathbb{R}^{N_c N_p \times N_h N_w} \leftarrow 0, \Delta = D \otimes I_{N_c}$
4  for iter $\leftarrow$ 1 to 300 do
5      |    $Y_Z \leftarrow ((M \circ Y) - (1 - M) \circ Z)$
6      |    $U \leftarrow (I + \alpha \Delta^T \Delta)^{-1} Y_Z V (V^T V)^{-1}$
7      |    $V \leftarrow Y_Z^T U (UU^T + \alpha U^T \Delta^T \Delta U)^{-1}$
8      ⌊    $Z \leftarrow (1 - M) \circ (UV^T)$.
    //    U: evolution, V: land types
9  $X \leftarrow UV^T$

3 Compression and Transmission

By choosing $N_r < N_c N_t$, the representation $UV^T$ gives a lossy compression of the matrix Y. This compression will be most effective when $N_c N_t / N_r$ is large. Moreover, this technique can leverage indications that for the 13 dimensional satellite images produced by an example satellite such as Sentinel-2, it is beneficial to do the compression in a block-wise manner with $N_h$ and $N_h$ being approximately 32-64. Moreover, blocks should be processed in order of the size of $\|M\|$ and blocks that are completely masked out (M=0) can be discarded. Once a low-rank representation for a block has been found each singular vector or land-type $V_r$ can be further compressed using JPEG, while the matrix U is preserved as is. Furthermore, in the case when M is independent of the spectral channels as in the case of cloud-free pixel masks, this implementation can employ a further simplification and compress $V_r \cdot M$ using JPEG if transmitting the reconstructed image is not desired. The mask M can also be compressed using JPEG. The rank $N_r$ can either be chosen on a per block basis (i.e. reduced until the loss is at a desirable level) or set globally. This implementation can optionally further transmit a JPEG compression of the residual image Y−X when the loss is larger than desired. When $N_r >= 2$ this implementation can select from a few options for predictive compression that can drive extreme compression performance.

4 Predictive Compression

Assuming the value for V has already been computed and transmitted for a previous image or set of images this technique can fix V, and compute U using the equation in Algorithm 1 and simply transmit only U per block which is a much smaller matrix than V! Take as an example $N_t=1$, $N_c=10$, $N_h=N_w=32$, $N_r=4$, then this solution can transmit only 40 numbers for each block instead of the full 10*64*64=20,480 numbers. This predictive compression works remarkably well, but may utilize on-board storage of the previous compressed V for the same location.

As mentioned above, ground-based resources tend to be relatively unconstrained. The ground-based resources can perform processing on existing images, such as to extract features, detect objects, create segmentation and/or hashes. Then, when a new image is captured by the satellite, similar computations can be performed in space on the satellite or another satellite. A comparison can be performed between the extracted features, detected objects segmentation and/or hashes of the current image and those for the existing images. For instance, the satellite can compute the hash(es) or detect objects, send this small metadata back to earth to identify differences. Alternatively, the extracted features, detected objects, segmentation and/or hashes for the existing images can be uploaded to the satellite and the satellite can perform the comparison. Any areas that have differences between the existing images and the new images can be detected by the comparison. Then, only the areas with differences are downloaded.

As mentioned above, multiple options are available as to how/when to compress. Some implementations can employ a hybrid of these options, e.g., use diff based on some images, GANS on some others, etc. To make decisions on various aspects such as: which compression technique(s); whether to just download the data without compression or not; or how aggressively to compress, some implementations can employ reinforcement learning techniques to build a selection model. Given the vast amount of historical satellite images and the compute capacity of the cloud, such a model can be trained and uploaded on the satellites.

A variation on the techniques mentioned above can involve utilizing a group of satellites collectively as a distributed network or constellation of satellites doing compression with diff-based compression of historical/previous images. This variation can utilize the storage in satellites to keep a history of images for a given number of days (e.g., a space-based cache). Then, on the fly, when a new image is captured, the new image can be compared against the historical image(s) and only differences can be downloaded to earth. Alternatively, different compression can be applied to the different parts and the unchanged parts of the new image.

One challenge to this implementation is that the historical image can be on a different satellite than the satellite that captured the current image. Various parameters can be considered to decide where to do the computation and whether to move the historical image or new image. If the parameters indicate that more bandwidth is available between satellites than between the satellites and the ground, then the comparisons can be performed on the satellites. Other parameters that can be considered when determining where to perform the comparisons can relate to the compute capacity at each satellite and ground-based resources, next visit to a ground station for each satellite and latency sensitivity of the image data, and/or the next pass of the same location by the same or a different satellite and how much locality is available by moving each option (maybe the same historical or new data will be used in the near future for one location in an upcoming visit).

Other parameters can relate to the similarity of the images captured previously and currently (time of day, weather conditions, etc.). These parameters can be applied to a single previous image and/or can extend to a series of historical images. While whole image comparison is described above, images can be divided or partitioned into multiple areas and historical images for each area can be obtained from different satellites.

The present concepts can distinguish high value image parts from lower value image parts. In some cases, high value image parts are parts that changed and low value image parts are unchanged from previous images. Several techniques are described to accomplish the distinguishing.

These techniques can include differential-based comparisons. The differential-based comparisons can identify the changed portions and those changed portions can be downloaded without downloading the rest of the image thus accomplishing data compression relative to the size of the entire image.

The techniques can also include image reconstruction, which can identify which low value image parts can be recreated on the ground based upon existing information and images. Other techniques utilize information from the ground, such as the location of active wildfires to determine the high value areas.

Figure 4:
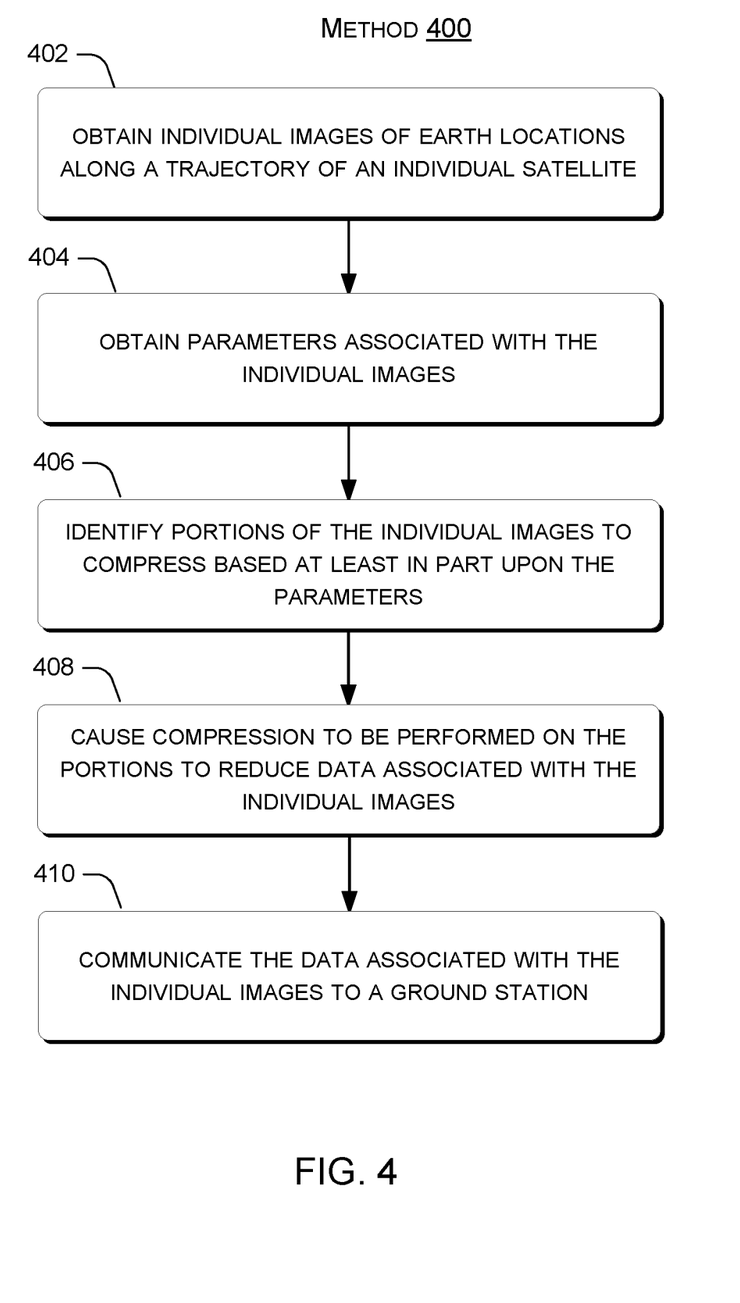

FIG. 4 shows another example satellite image management method or technique 400. Block 402 can obtain individual images of earth locations along a trajectory of an individual satellite. The method can also obtain existing images that at least partially overlap with the earth locations. For instance, an individual image may include parts in two or more existing images.

Block 404 can obtain parameters associated with the individual images. Various example parameters are discussed above and below. The parameters can relate to the image itself, such as changes to the earth's surface at the location compared to previous images, interest in the images, resolution of the current image and previous images, hardware parameters, and/or bandwidth parameters. The parameters can also include the location of the existing images. For instance, the existing images can be located on earth, such as on computing resources in a data center and/or the existing images could be located on the satellite or another satellite.

Block 406 can identify portions of the individual images to compress based at least in part upon the parameters. In some cases, differences between the current image and existing images of the same location can be compared. In some cases, the unchanged regions can be discarded and only the changed portions can be stored and/or downloaded. As such, compression is achieved in that only high value image data is downloaded rather than the whole image. The unchanged portions can subsequently be recreated with earth-based resources from the existing images. In other cases, further compression can be performed to further decrease data. Unchanged portions can be compressed and changed portions can be uncompressed. In some cases, a relatively higher degree of compression can be performed on compressed portions and a relatively lesser degree of compression can be performed on the changed portions.

Block 408 can cause compression to be performed on the portions to reduce data associated with the individual images. In some cases, the compression can entail separating the changed parts or high value data from unchanged parts. The high value parts can be prioritized for storing and/or downloading. The low value parts can be discarded or handled as a low priority based upon available resources.

Block 410 can communicate the data associated with the individual images to a ground station. The data from the individual images can be communicated from the satellite that captured them or from another satellite, such as a satellite that processed the images, had storage space for the image data, and/or has bandwidth availability to download the image data. In cases where the data entails only the high value or changed data, the low value data can be recreated with earth-based resources.

The order in which the disclosed methods are described is not intended to be construed as a limitation, and any number of the described acts can be combined in any order to implement the method, or an alternate method. Furthermore, the methods can be implemented in any suitable hardware, software, firmware, or combination thereof, such that a computing device can implement the method. In one case, the methods are stored on one or more computer-readable storage media as a set of instructions such that execution by a processor of a computing device causes the computing device, such as on a component to perform the method.

Various examples are described above. Additional examples are described below. One example includes a system comprising a communication assembly configured to communicate with satellites that are configured to capture images of earth, and a context-aware image manager configured to identify a trajectory of an individual satellite until the satellite passes over a ground station and to determine for individual locations along the trajectory whether to download individual images of the individual locations to the ground station for processing by earth-based resources or to process the individual images utilizing space-based resources and download only processed data from the individual images to the ground station.

Another example can include any of the above and/or below examples where the communication assembly and the context-aware image manager are manifest on a ground-based computing resource.

Another example can include any of the above and/or below examples where the ground-based resources comprise the ground station and/or a data center.

Another example can include any of the above and/or below examples where the system further comprises the individual satellite.

Another example can include any of the above and/or below examples where the individual satellite and the ground station each include an instance of the communication assembly and an instance of the context-aware image manager.

Another example can include a device-implemented method comprising tracking a satellite relative to locations on earth, ground stations, and other satellites, identifying parameters associated with the tracked satellite, and managing images captured by the satellite for individual locations based upon the identified parameters.

Another example can include any of the above and/or below examples where the tracking comprises tracking a trajectory to a first individual ground station that will be in image downloading relation with the satellite.

Another example can include any of the above and/or below examples where the tracking comprises tracking locations the satellite will be in position to image prior to being in range to download the images with the first individual ground station.

Another example can include any of the above and/or below examples where the identifying parameters comprises identifying constraining resources associated with the tracked satellite.

Another example can include any of the above and/or below examples where the constraining resources comprise a downlink (e.g., download) bandwidth parameter from the satellite to the first individual ground station.

Another example can include any of the above and/or below examples where the identifying parameters comprises identifying parameters associated with age and resolution of existing images for the individual locations.

Another example can include any of the above and/or below examples where the managing images comprises comparing the images for the individual locations to existing images of the locations for differences and only downloading the differences from the satellite to the first individual ground station.

Another example can include any of the above and/or below examples where the managing images comprises causing the images to be communicated from the satellite to another satellite that has the existing images and causing the another satellite to compare the images and the existing images to identify the differences.

Another example can include any of the above and/or below examples where the managing images comprises distinguishing low value areas and high value areas of the images, downloading only the high value areas to the first individual ground station, and reconstructing the low value areas utilizing earth bound resources.

Another example can include any of the above and/or below examples where the managing images comprises utilizing parameters associated with real-time events and/or interest in the location to determine a degree of data compression to perform on the images associated with the locations.

Another example can include any of the above and/or below examples where the managing images comprises causing the satellite to communicate the images to another satellite and causing the another satellite to download the images to an individual ground station.

Another example can include any of the above and/or below examples where the managing images comprises causing the satellite to communicate the images to another satellite and causing the another satellite to perform the managing and to download processed image data to an individual ground station.

Another example can include a satellite comprising a camera configured to capture images of locations on earth, storage configured to store the images, and a processor configured to execute instructions stored on the storage, to obtain individual images of earth locations along a trajectory of the satellite, obtain parameters associated with the individual images, identify portions of the individual images to compress based at least in part upon the parameters, cause compression to be performed on the portions to reduce data associated with the individual images, and communicate the data associated with the individual images to a ground station.

Another example can include any of the above and/or below examples where the processor causes the compression to be performed on the satellite or by another satellite.

Another example can include any of the above and/or below examples where the identifying portions comprises comparing hashes of the portions to hashes of existing images of the locations.

CONCLUSION

Although techniques, methods, devices, systems, etc., pertaining to content-aware satellite image management are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device-implemented method, comprising:
    tracking a trajectory of a satellite over time to determine individual locations flown over by the satellite along the trajectory;
    identifying age and resolution parameters associated with previously-captured images of the individual locations; and,
    based at least on the age and resolution parameters of the previously-captured images, managing further images of the individual locations captured by the satellite.

2. The device-implemented method of claim 1, wherein the tracking is performed relative to a first individual ground station that will be in image downloading relation with the satellite.

3. The device-implemented method of claim 2, wherein the tracking comprises tracking locations that the satellite will be in position to image prior to being in range to download the further images with the first individual ground station.

4. The device-implemented method of claim 3, wherein the identifying further comprises identifying constraining resources associated with the satellite.

5. The device-implemented method of claim 4, wherein the constraining resources comprise a download bandwidth parameter from the satellite to the first individual ground station.

6. The device-implemented method of claim 1, wherein the managing comprises;
    comparing the further images of the individual locations to the previously-captured images of the individual locations to determine differences; and
    downloading the differences to a ground station.

7. The device-implemented method of claim 6, wherein the managing comprises;
    causing the further images to be communicated from the satellite to another satellite that has the previously-captured images; and
    causing the another satellite to perform the comparing to identify the differences and download the differences to the ground station.

8. The device-implemented method of claim 1, wherein the managing comprises distinguishing low value areas and high value areas of the further images, downloading only the high value areas to a ground station, and reconstructing the low value areas utilizing earth-bound resources.

9. The device-implemented method of claim 1, wherein the managing comprises utilizing other parameters associated with real-time events and/or interest in the individual locations to determine a degree of data compression to perform on the further images of the individual locations.

10. A device-implemented method, comprising:
    tracking a trajectory of a satellite over time to determine individual locations flown over by the satellite along the trajectory;
    identifying parameters associated with previously-captured images of the individual locations flown over by the satellite; and,
    based at least on the parameters associated with the previously-captured images, managing further images of the individual locations captured by the satellite,
    wherein the managing includes:
        causing the satellite to, in at least one instance, communicate at least one of the further images to another satellite, and
        causing the another satellite to transmit the at least one of the further images to an individual ground station.

11. The device-implemented method of claim 10, wherein the managing comprises:
    determining that the another satellite is within a designated range of the individual ground station.

12. The device-implemented method of claim 11, wherein the managing comprises:
determining that the satellite is not within the designated range of the individual ground station.

13. The device-implemented method of claim 12, wherein the managing comprises:
determining that storage is constrained on the satellite.

14. The device-implemented method of claim 13, wherein the managing comprises:
determining that the satellite lacks sufficient storage to store the at least one of the further images.

15. A device-implemented method, comprising:
tracking a trajectory of a satellite over time to determine individual locations flown over by the satellite along the trajectory;
identifying parameters associated with previously-captured images of the individual locations flown over by the satellite; and,
based at least on the parameters associated with the previously-captured images, managing further images of the individual locations captured by the satellite, wherein the managing includes:
causing the satellite to, in at least one instance, communicate at least one of the further images to another satellite, and
causing the another satellite to process the at least one of the further images to obtain at least one processed image and send the at least one processed image to an individual ground station.

16. The device-implemented method of claim 15, wherein the managing comprises:
causing the another satellite to determine differences between the at least one of the further images and at least one of the previously-captured images; and
causing the another satellite to send the differences to the individual ground station.

17. The device-implemented method of claim 15, wherein the managing is further based at least on parameters relating to network bandwidth constraints of the satellite.

18. The device-implemented method of claim 15, wherein the managing is further based at least on parameters relating to storage constraints of the satellite.

19. The device-implemented method of claim 15, wherein the managing is further based at least on parameters relating to availability of the another satellite to communicate with the satellite.

20. The device-implemented method of claim 15, wherein the parameters relate to changes in the further images relative to the previously-captured images.

* * * * *